United States Patent [19]

Quinby

[11] Patent Number: 4,537,818

[45] Date of Patent: Aug. 27, 1985

[54] METHOD FOR PRODUCTION OF CERAMIC OXIDE AND CARBIDE BODIES BY POLYMER INCLUSION AND DECOMPOSITION

[75] Inventor: Thomas C. Quinby, Kingston, Tenn.

[73] Assignee: The United States of America as represented by the United States Department of Energy, Washington, D.C.

[21] Appl. No.: 645,653

[22] Filed: Aug. 30, 1984

[51] Int. Cl.$^3$ .............................................. C01B 31/07
[52] U.S. Cl. .................................. 428/262; 423/447.5; 428/408
[58] Field of Search ........................... 428/262, 408; 423/447.5

[56] References Cited

U.S. PATENT DOCUMENTS

| | | | |
|---|---|---|---|
| 3,242,000 | 3/1966 | Lynch | 423/447.5 |
| 3,400,181 | 9/1968 | Battista | 423/447.9 |
| 3,403,008 | 9/1968 | Hamling | 423/447.5 |
| 3,479,151 | 11/1969 | Gutzeit | 423/447.5 |
| 3,803,056 | 4/1974 | Hart | 252/478 |

OTHER PUBLICATIONS

Maier, "Preparation of Nuclear Accelerator Targets by Vacuum Evaporation", IEEE Transactions on Nuclear Science, vol. NS-28, No. 2, Apr. 1981, pp. 1576-1583.

*Primary Examiner*—Marion E. McCamish
*Attorney, Agent, or Firm*—Stephen D. Hamel; Judson R. Hightower

[57] ABSTRACT

A method for the preparation of thin, free-standing metal oxide films which are useful as nuclear accelerator target materials. Cations of any metal except those of Group IA and precious metals, such as, U, Zr, Nd, Ce, Th, pr or Cr, are absorbed on a thin film of polymeric material, such as, carboxymethylcellulose, viscose rayon or cellophane. The cation impregnated polymeric material is dried. Then the impregnated film is heated in an inert atmosphere to form a carbonized membrane. The carbonized membrane is oxidized to yield a thin, self-supporting, metal oxide membrane. Or, the membrane can be heated in an inert atmosphere to yield a thin, self-supporting, metal carbide-containing membrane.

32 Claims, No Drawings

METHOD FOR PRODUCTION OF CERAMIC OXIDE AND CARBIDE BODIES BY POLYMER INCLUSION AND DECOMPOSITION

BACKGROUND OF THE INVENTION

Field of the Invention and Contract Statement

The U.S. Government has rights in this invention pursuant to Contract No. W-7405-ENG-26 between the U.S. Department of Energy and Union Carbide Corporation, Nuclear Division.

The invention relates to a process of preparing nuclear accelerator targets and to such targets themselves.

DISCUSSION OF BACKGROUND AND PRIOR ART

In certain nuclear reaction studies, it is desirable to use a thin oxide film as a target material. Such films, when formed from oxide powders by conventional techniques, are too discontinuous in structure to be self-supporting. When a backing is used to support the discontinuous oxide target material, additional contaminating metals and oxides are introduced.

U.S. Pat. No. 3,242,000 teaches a procedure comprising impregnating an acrylic fiber textile with a solution containing at least one compound having a refractory metal cation, drying the textile, and finally carbonizing the impregnated textile in an atmosphere containing at least some oxygen, preferably at a level of 10 to 20 percent. See particularly col. 2, lines 43 to 57. The patent does not disclose the extent to which the compound having a refractory metal cation is converted to the corresponding refractory metal oxide during subsequent treatment thereof.

U.S. Pat. No. 3,403,008 discloses the preparation of metal carbide containing fibers and textiles derived from a preformed organic polymeric material (including viscose rayon). The process includes impregnating a rayon fabric with a salt of a metal, drying the fabric, carbonizing the dried fabric and thereafter heating the carbonized fabric in a non-oxidizing atmosphere at a temperature sufficient to form a carbonized fabric containing metal carbide.

U.S. Pat. No. 3,400,181 discloses the preparation of a shaped carbon article by first forming any desired shape from cellulose crystallite aggregates obtained from rayon or cellophane (see col. 2, lines 22 to 27) which are mixed either with a metal compound or boron oxide, thereafter drying the shaped article and finally carbonizing the same at a temperature above 400° C. (see col. 1, lines 53 to 75, and col. 4, lines 1 and 18 to 39). A major distinction between the process described by U.S. Pat. No. 3,400,181 and that described in this application resides in the exact composition of the product obtained so far as the metal or boron content is concerned.

U.S. Pat. No. 3,803,056 teaches impregnating a regenerated cellulose fabric such as rayon with a heavy metal salt, drying the impregnated fabric and thereafter carbonizing the dried fabric to produce a carbonized fabric to which the heavy metal is chemically bound, but not in the form of a metal carbide.

U.S. Pat. No. 3,749,151 teaches a method of carbonizing fibrous cellulosic materials which have been loaded with heavy metal compounds such as thorium, lanthanum or the like. See particularly col 8., lines 21 to 26. The patent does not specifically disclose that such heavy metal compounds are converted to metal oxides in the course of the carbonization.

Maier, "IEEE Transactions On Nuclear Science", Vol. NS-28, No. 2, (April 1981), pp. 1576 to 1583, discloses the preparation of free-standing (unsupported) nuclear accelerator targets by various methods.

SUMMARY OF THE INVENTION

An object of the invention is to provide a process for the preparation of thin, self-supporting, metal oxide or metal carbide films for use as nuclear accelerator targets. Another object of the invention is to provide such thin, self-supporting metal oxide or metal carbide film for use as nuclear accelerator targets. Other objects and advantages of the invention are set out herein or are obvious herefrom to one ordinarily skilled in the art.

The objects and advantages of the invention are achieved by the process of the invention.

To achieve the foregoing and other objects and in accordance with the purpose of the invention, as embodied and broadly described herein, the process of the invention involves the preparation of a thin, free-standing metal oxide film. The process includes absorbing cations of a metal which forms a stable oxide on a thin film of polymeric material selected from the group consisting of carboxymethylcellulose, viscose rayon and cellophane. The film of cation-impregnated polymeric material is heated in an inert atmosphere to form a carbonized membrane. The carbonized membrane is oxidized to yield a thin, self-supporting, metal oxide membrane.

Preferably the thin film of polymeric material is a thin film of carboxymethylcellulose. Preferably the thin film of polymeric material is a non-woven material. Preferably the cation of the metal is the nitrate cation of uranium nitrate, zirconium nitrate, thorium nitrate, praseodymium nitrate, neodymium nitrate, chromium nitrate or cerium nitrate. Also, preferably the metal is any metal except a metal of Group 1A of the Periodic Table or a precious metal.

The absorption is preferably conducted in an aqueous solution containing the cations. Preferably the cation molarity of the aqueous solution containing the cations is between about 0.05 and about 1.0 and most preferably the cation molarity is between about 0.1 and about 0.5.

The oxidizing step is preferably conducted by contacting the hot membrane with air. Preferably the metal oxide forming the thin, free-standing film is $CeO_2$, $ThO_2$, $Pr_2O_3$, $Cr_2O_3$, $U_3O_8$, $ZrO_2$ or $Nd_2O_3$. Preferably the thin film of polymeric material is a flat contiguous film, whereby the resultant thin, free-standing film is a thin, flat, contiguous, ceramic film. The thin film of polymeric material can be a woven fabric, whereby the resultant thin, free-standing film is a woven, ceramic fabric.

The invention also includes the thin, free-standing film as produced by the process of the invention. Preferably the thin, free-standing film is a thin, flat contiguous, ceramic film. Most preferably the thin, flat, contiguous, ceramic film is comprised of $CeO_2$, $ThO_2$, $Pr_2O_3$, $Cr_2O_3$, $U_3O_8$, $ZrO_2$ or $NdO_3$. Preferably the thin, free-standing film is a non-woven, ceramic fabric.

The invention further involves the process for the preparation of a thin, free-standing metal oxide or metal carbide film. The process includes absorbing cations of an inorganic acid which forms a carbide, on a thin film of polymeric material selected from the group consisting of carboxymethylcellulose, viscose rayon and cellophane. The film of cation-impregnated polymeric material is dried. Then the dried film of cation-impregnated polymeric material in an inert atmosphere to form a carbonized membrane. The carbonized membrane is heated in an inert atmosphere (oxygen-free) to yield a thin, self-supporting, metal carbide-containing membrane.

Preferably the thin film of polymeric material is a thin film of carboxymethylcellulose. Preferably the thin film of polymeric material is woven material. Preferably the cation is the cation of an inorganic acid. Most preferably the cation is obtained from boric acid.

The absorption is preferably conducted in a hot or boiling aqueous solution containing the cations.

Preferably the absorption is conducted in an aqueous solution containing the cations. Preferably the cation molarity of the aqueous solution containing the cations is between about 0.05 and about 1.0 and most preferably the cation molarity is between about 0.1 and about 0.5.

The metal carbide forming the thin, free-standing, film is preferably boron carbide. Preferably the thin film of polymeric material is a flat contiguous film, whereby the resultant thin, free-standing film is a thin, flat, contiguous, ceramic film. The thin film of polymeric material most preferably is a woven fabric, whereby the resultant thin, free-standing film is a woven, ceramic fabric.

The invention still further includes the thin, free-standing film as produced by the process of the invention. Preferably the thin, free-standing film is a thin, flat contiguous, ceramic film. Preferably the thin, free-standing film is woven, ceramic fabric. Most preferably the woven, ceramic fabric is comprised by boron carbide in a carbon matrix.

The ceramic films produced by the invention technique are apparently of a noncrystalline structure, which is akin to that of a glass. This is substantiated by the complete absence of characteristic x-ray diffraction patterns exhibited by conventional ceramic materials of the same composition. Also, no other mechanism, such as sintering, can explain the mechanical strength of the ceramic films of the invention.

The invention provides the preparation of complex ceramic shapes by simple plastic molding or in the form of woven ceramic cloth. The invention method is simple, requires low temperatures, is easily configured prior to decomposition and results in a high strength product with low loss of expensive cation materials.

Reference will now be made in detail to the present preferred embodiments of the invention.

DETAILED DESCRIPTION OF THE INVENTION

All parts, percentages, ratios and proportions are on a weight basis unless otherwise stated herein or obvious herefrom to one ordinarily skilled in the art.

The membranes used in the invention are preferably of the carboxymethylcellulose type. Such membranes are readily available as wrappings used in the meat packing industry, or in higher purity form, from suppliers of dialysis tubing. The membranes or thin films can also be made of viscose rayon or cellophane. The thin films, for example can, be flat continuous films or sheets, or woven fabrics.

In this manner, ceramic films of metal oxides are obtained. Examples of the metals are U, Zr, Nd, Ce, Th, Pr and Cr. Examples of useful metal nitrates are uranium nitrate, zirconium nitrate, thorium nitrate, praseodymium nitrate, neodymium nitrate, chromium nitrate and cerium nitrate. The use of metal nitrates is preferred.

The metals (elements) of Group 1A of the Periodic Table and the precious metals are excluded from the useful metals of the invention because they do not form stable oxides and/or carbides.

The cations can also be obtained from inorganic acids, preferably boric acid. In such instances, the cations of the inorganic acids contain the metals, such as boron. Inorganic acids are only used which contain metals in their cations. In this manner, ceramic films of metal carbides are obtained.

The cations of metals are absorbed onto the thin film (woven or non-woven) of polymeric material. Aqueous solutions of the metal salt or inorganic acids are preferably used to absorb the cations. The aqueous solutions are preferably hot when the thin film is placed in it, and then the solution is preferably boiled to assist absorption or loading of the cation into the thin film. The cation molarity of the solution containing the cations is preferably between about 0.05 and about 1.0 and most preferably between about 0.1 and about 0.5. After the degree of absorption desired is achieved, the solution with the film still submerged in it is usually allowed to cool to room temperature.

The cation-impregnated film is then dried using any suitable method. Preferably the cation-impregnated film is placed in the middle of a sandwich arrangement of at least one flat sheet each side and then dried first using a heat lamp followed by treatment in a drying oven. The heat lamp stage usually takes about one hour; the drying oven stage is usually conducted at about 230° C. or about two hours.

The metal oxide forming the thin, free-standing, metal oxide film preferably is $CeO_2$, $ThO_2$, $Pr_2O_3$, $Cr_2O_3$, $U_3O_8$, $ZrO_2$ or $Nd_2O_3$. The metal carbide forming the thin, free-standing, metal carbide film preferably is boron carbide.

The resultant thin, free-standing films can be, for example, flat, contiguous, ceramic films (with or without holes therein) or woven, ceramic fabrics.

The above-described dialysis tubing-type membranes made of carboxymethylcellulose were used in the following examples, unless otherwise stated therein.

EXAMPLE 1

Thin films of several metallic oxides were prepared using dialysis tubing obtained from Union Carbide Corp., Films-Packaging Div., Chicago, Ill. The carboxymethylcellulose membranes were washed in running water for 3 to 4 hours to remove trace amounts of glycerin and then treated with 0.3 percent sodium sulfide solution at 80° C. for 1 minute followed by a hot water wash and acidification with 0.2 percent sulfuric acid solution to remove sulfur compounds. The membrane was then given a final water wash to remove the acid. (This purification procedure was provided by Union Carbide Corp., Films-Packaging Division.)

The membrane was then submerged in a heated aqueous solution of the nitrate salt of the desired metal. (Uranium nitrate, zirconium nitrate, thorium nitrate, praseodymium nitrate, neodymium nitrate, chronium nitrate and cerium nitrate were used.) Effective loading was accomplished by heating the solution at a low boil until all bubble formation at the membrane surface had ceased. The solution was then cooled to room temperature with the membrane submerged.

The loaded membrane was placed in a sandwich array consisting of a layer of Teflon, a copper sheet and a quartz plate on each side of the membrane. Such assembly was weighed to maintain flatness and dried for one hour under a heat lamp. The weighed assembly was then transferred to a drying oven and heated for two hours at 230° C. The dried, and partially carbonized, membrane was removed from the sandwich assembly, placed on a surface of $ZrO_2$-felt supported by a quartz plate, and placed in a controlled atmosphere furnace. The membrane was heated to 700° C. at the rate of 30° C. per minute while purging with flowing argon. When the temperature reached 700° C., the argon purge was terminated and the furnace was permitted to backfill with air. The carbonized membrane slowly oxidized and after 30 minutes was completely oxidized, thereby producing a thin, free-standing, metal oxide film useful as a nuclear accelerator target.

Each of the targets, prepared as described above, was clamped between two matching frames. The targets were then ready for use. The results obtained from the films prepared by the above procedure are set out below in the Table:

TABLE

| | Targets Produced from Carboxymethylcellulose | | | | |
|---|---|---|---|---|---|
| Target | Approximate Cation Molarity of Loading Solution, (A) | Membrane Thickness, in. | Target Areal Density | Moles/$cm^2$ × $10^{-6}$, (B) | Relative Absorption, B/A |
| $CeO_2$ | 0.273 | 0.001 | 375 μg/$cm^2$ | 2.179 | 7.98 |
| $ThO_2$ | 0.193 | 0.001 | 446 μg/$cm^2$ | 1.689 | 8.75 |
| $Pr_2O_3$ | 0.294 | 0.001 | 368 μg/$cm^2$ | 1.116 | 7.61 |
| $Cr_2O_3$ | 0.484 | 0.001 | 320 μg/$cm^2$ | 2.105 | 8.69 |
| $Cr_2O_3$ | 0.484 | 0.0005[1] | 200 μg/$cm^2$ | 1.316 | 5.43 (10.86) |
| $U_3O_8$ | 0.176 | 0.001 | 400 μg/$cm^2$ | 0.475 | 8.09 |
| $ZrO_2$ | 0.247 | 0.001 | 260 μg/$cm^2$ | 2.110 | 8.54 |
| $Nd_2O_3$ | 0.243 | 0.001 | 335 μg/$cm^2$ | 0.996 | 8.20 |
| $U_3O_8$ | 0.176 | 0.004[2] | 3.89 mg/$cm^2$ | 4.62 | — |

Notes:
[1]"Cuprophone" membrane.
[2]Tee-Pak Corporation.

The films thusly produced were self-supporting. The experimental films prepared from the oxides of the metals U, Zr, Nd, Ce, Th, Pr and Cr had an areal density range from 150 ug/$cm^2$ to 4 mg/$cm^2$.

EXAMPLE 2

Example 1 was repeated, except that a series of woven viscose rayon fabrics were each impregnated with one of the metal nitrate solutions. After thermal decomposition, in each instance a woven ceramic fabric has remained.

EXAMPLE 3

Example 1 was repeated, except that a carboxymethylcellulose film was impregnated with a boric acid solution and decomposed in an inert environment to produce $B_4C$ in a carbon matrix.

By way of summary, the invention involves a method for preparing thin, free-standing films of selected metal oxides. The films are prepared by submerging a carboxymethylcellulose membrane in a solution of metal nitrate salt. The loaded membrane is dried and decomposed in an inert atmosphere, followed by oxidation, to form a metal oxide film.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Process for the preparation of a thin, free-standing metal oxide film comprising:
   (a) absorbing cations of a metal which forms a stable oxide on a thin film of polymeric material selected from the group consisting of carboxymethylcellulose, viscose rayon and cellophane;
   (b) drying the film of cation-impregnated polymeric material;
   (c) heating the dried film of cation-impregnated polymeric material in an inert atmosphere to form a carbonized membrane; and
   (d) oxidizing the carbonized membrane to yield a thin, self-supporting, metal oxide membrane.

2. The process as claimed in claim 1 wherein the thin film of polymeric material is a thin film of carboxymethylcellulose.

3. The process as claimed in claim 1 wherein the cation of the metal is the nitrate cation of uranium nitrate, zirconium nitrate, thorium nitrate, praseodymium nitrate, neodymium nitrate, chromium nitrate or cerium nitrate.

4. The process as claimed in claim 1 wherein the metal is any metal except a metal of Group 1A of the Periodic Table or a precious metal.

5. The process as claimed in claim 1 wherein the absorption is conducted in an aqueous solution containing the cations.

6. The process as claimed in claim 5 wherein the cation molarity of the aqueous solution containing the cations is between about 0.05 and about 1.0.

7. The process as claimed in claim 5 wherein the cation molarity of the aqueous solution containing the cations is between about 0.1 and about 0.5.

8. The process as claimed in claim 1 wherein the thin film of polymeric material is a non-woven material.

9. The process as claimed in claim 1 wherein the metal oxide forming the thin, free-standing film is $CeO_2$, $ThO_2$, $Pr_2O_3$, $Cr_2O_3$, $U_3O_8$, $ZrO_2$ or $Nd_2O_3$.

10. The process as claimed in claim 1 wherein the thin film of polymeric material is a flat contiguous film and wherein the resultant thin, free-standing film is thin, flat, contiguous, ceramic film.

11. The process as claimed in claim 1 wherein the thin film of polymeric material is a woven fabric and wherein the resultant thin, free-standing film is a woven, ceramic fabric.

12. The process as claimed in claim 1 wherein oxidizing step (d) is conducted by contacting the hot membrane with air.

13. The thin, free-standing film as produced by the process of claim 1.

14. The thin, free-standing film as claimed in claim 13 wherein the thin, free-standing film is a thin, flat contiguous, ceramic film.

15. The thin, free-standing film as claimed in claim 14 wherein the thin, flat, contiguous, ceramic film is comprised of $CeO_2$, $ThO_2$, $Pr_2O_3$, $Cr_2O_3$, $U_3O_8$, $ZrO_2$ or $Nd_2O_3$.

16. The thin, free-standing film as claimed in claim 13 wherein the thin, free-standing film is a non-woven, ceramic fabric.

17. Process for the preparation of a thin, free-standing metal oxide or metal carbide film comprising:
 (a) absorbing cations of an inorganic acid which forms a carbide on a thin film of polymeric material selected from the group consisting of carboxymethylcellulose, viscose rayon and cellophane;
 (b) drying the film of cation-impregnated polymeric material;
 (c) heating the dried film of cation-impregnated polymeric material in an inert atmosphere to form a carbonized membrane; and
 (d) heating the carbonized membrane in an inert atmosphere to yield a thin, self-supporting, metal carbide-containing membrane.

18. The process as claimed in claim 17 wherein the thin film of polymeric material is a thin film of carboxymethylcellulose.

19. The process as claimed in claim 17 wherein the cation is the cation of an inorganic acid.

20. The process as claimed in claim 17 wherein the cation is obtained from boric acid.

21. The process as claimed in claim 17 wherein the absorption is conducted in a hot or boiling aqueous solution containing the cations.

22. The process as claimed in claim 17 wherein the absorption is conducted in an aqueous solution containing the cations.

23. The process as claimed in claim 22 wherein the cation molarity of the aqueous solution containing the cations is between about 0.05 and about 1.0.

24. The process as claimed in claim 22 wherein the cation molarity of the aqueous solution containing the cations is between about 0.1 and about 0.5.

25. The process as claimed in claim 17 wherein the thin film of polymeric material is woven material.

26. The process as claimed in claim 17 wherein the metal carbide forming the thin, free-standing, film is boron carbide.

27. The process as claimed in claim 17 wherein the thin film of polymeric material is a flat contiguous film and wherein the resultant thin, free-standing film is thin, flat, contiguous, ceramic film.

28. The process as claimed in claim 17 wherein the thin film of polymeric material is a woven fabric and wherein the resultant thin, free-standing film is a woven, ceramic fabric.

29. The thin, free-standing film as produced by the process of claim 17.

30. The thin, free-standing film as claimed in claim 29 wherein the thin, free-standing film is a thin, flat contiguous, ceramic film.

31. The thin, free-standing film as claimed in claim 29 wherein the thin, free-standing film is a woven, ceramic fabric.

32. The thin, free-standing film as claimed in claim 31 wherein the woven, ceramic fabric is comprised of boron carbide in a carbon matrix.

* * * * *